US010509948B2

(12) United States Patent
Li

(10) Patent No.: US 10,509,948 B2
(45) Date of Patent: Dec. 17, 2019

(54) METHOD AND DEVICE FOR GESTURE RECOGNITION

(71) Applicant: BOE TECHNOLOGY GROUP CO., LTD., Beijing (CN)

(72) Inventor: Yingjie Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 85 days.

(21) Appl. No.: 15/945,455

(22) Filed: Apr. 4, 2018

(65) Prior Publication Data

US 2019/0057246 A1 Feb. 21, 2019

(30) Foreign Application Priority Data

Aug. 16, 2017 (CN) .......................... 2017 1 0701881

(51) Int. Cl.
*G06K 9/00* (2006.01)
*G06F 3/01* (2006.01)
(Continued)

(52) U.S. Cl.
CPC ......... *G06K 9/00234* (2013.01); *G06F 3/017* (2013.01); *G06F 3/0304* (2013.01);
(Continued)

(58) Field of Classification Search
CPC ....... G06K 9/00234; G06F 3/017; G06T 7/11; G06T 7/90; G06T 2207/30201;
(Continued)

(56) References Cited

U.S. PATENT DOCUMENTS 5,802,220 A * 9/1998 Black ................. G06K 9/00248
382/100
6,677,969 B1 * 1/2004 Hongo .................... G06F 3/013
345/156
(Continued)

FOREIGN PATENT DOCUMENTS

CN 101344816 A 1/2009
CN 102324019 A 1/2012
(Continued)

OTHER PUBLICATIONS

First Office Action in CN Appl. No. 201710701881.3, dated Jun. 20, 2019.
(Continued)

*Primary Examiner* — Amir Alavi
(74) *Attorney, Agent, or Firm* — Foley & Lardner LLP; James F. Ewing; Paul M. H. Pua

(57) ABSTRACT

Embodiments of the application provide a method and a device for gesture recognition. The method includes: acquiring an image of a user; detecting whether the image includes a human face (2); and performing gesture recognition based on information of the detected human face (2), which comprises: dividing a first region (3) including the human face (2) in the image; dividing a plurality of detection regions (A1-A4) outside the first region (3); determining respective priority levels of the plurality of detection regions (A1-A4); and in an order from a high priority level to a low priority level, performing the gesture recognition in the plurality of detection regions (A1-A4) in sequence.

16 Claims, 7 Drawing Sheets

(51) Int. Cl.
*G06T 7/11* (2017.01)
*G06T 7/90* (2017.01)
*G06F 3/03* (2006.01)

(52) U.S. Cl.
CPC ............... *G06T 7/11* (2017.01); *G06T 7/90* (2017.01); *G06T 2207/10024* (2013.01); *G06T 2207/30201* (2013.01)

(58) Field of Classification Search
CPC ....... G06T 2207/10024; H04L 65/4092; H04L 65/607; H04N 21/426
See application file for complete search history.

(56) References Cited

U.S. PATENT DOCUMENTS

| | | | | |
|---|---|---|---|---|
| 7,403,643 | B2* | 7/2008 | Ianculescu | G06K 9/00228 382/118 |
| 7,440,593 | B1* | 10/2008 | Steinberg | G06K 9/00228 348/207.99 |
| 7,460,694 | B2* | 12/2008 | Corcoran | G06K 9/00234 382/118 |
| 7,630,527 | B2* | 12/2009 | Steinberg | G06K 9/00228 348/77 |
| 7,778,483 | B2* | 8/2010 | Messina | G06K 9/00234 348/254 |
| 8,055,029 | B2* | 11/2011 | Petrescu | G06K 9/00234 382/118 |
| 8,055,067 | B2* | 11/2011 | Petrescu | G06K 9/00 382/115 |
| 9,292,097 | B1 | 3/2016 | Miller et al. | |
| 9,829,984 | B2* | 11/2017 | Dai | G06F 3/017 |
| 2011/0158476 | A1* | 6/2011 | Fahn | G06K 9/00288 382/103 |
| 2019/0057246 | A1* | 2/2019 | Li | G06K 9/00234 |
| 2019/0204930 | A1* | 7/2019 | Li | G06F 3/017 |

FOREIGN PATENT DOCUMENTS

| | | |
|---|---|---|
| CN | 102592115 A | 7/2012 |
| CN | 102799855 A | 11/2012 |
| CN | 202815864 U | 3/2013 |
| CN | 104049760 A | 9/2014 |
| CN | 105095882 A | 11/2015 |
| CN | 106020227 A | 10/2016 |

OTHER PUBLICATIONS

Yu-Hang, Liu, "Research on Visual Guidance and Control Method for UR robot Based on Gesture Understanding"; Changchun Institute of Optics, Fine Mechanics and Physics; Chinese Academy of Sciences; Oct. 2016 (Dissertation; 118 pgs.)

* cited by examiner

METHOD AND DEVICE FOR GESTURE RECOGNITION

CROSS REFERENCE TO RELATED APPLICATIONS

This application claims priority to and the benefit of Chinese Patent Application No. 201710701881.3 as filed on Aug. 16, 2017, the disclosure of which is incorporated herein in its entirety by reference.

TECHNICAL FIELD

The present application relates to a method and a device for gesture recognition.

BACKGROUND

A smart equipment has spread to various aspects of our life. One emphasis in the smart equipment technologies is how to realize human-computer interaction more conveniently and effectively. Interaction using gesture has the merits of nature and convenience and can be applied to many scenarios. For the sake of improving the accuracy of gesture recognition, it is often expected to use image sensors and processors that possess more powerful functions. This raises cost of gesture recognition and does not necessarily improve the efficiency of gesture recognition.

The method and the device for gesture recognition have space for improvement.

SUMMARY

According to embodiments of the present application, there are provided a method and a device for gesture recognition.

In a first aspect of the application, there is provided a method for gesture recognition, comprising: acquiring an image of a user; detecting whether the image includes a human face; and performing gesture recognition based on information of the detected human face in response to detecting that the image includes the human face. The performing of the gesture recognition based on the information of the detected human face comprises: dividing a first region including the human face from the image; dividing another region except the first region into a plurality of detection regions; determining respective priority levels of the plurality of detection regions; and performing sequentially the gesture recognition in the plurality of detection regions in an order from a high priority level to a low priority level.

In an embodiment of the application, the plurality of detection regions are divided according to a preset shape and size.

In an embodiment of the application, the dividing of the plurality of detection regions includes: detecting a continuous skin color zone in the image; and dividing the plurality of detection regions so that at least one of the detection regions include the continuous skin color zone.

In an embodiment of the application, the determining of the respective priority levels of the plurality of detection regions comprises: determining the respective priority levels of the plurality of detection regions according to an area of the continuous skin color zone contained in each of the detection regions.

In an embodiment of the application, the method for gesture recognition further comprises altering a color of the first region to distinguish the color of the first region from a skin color.

In an embodiment of the application, the determining of the respective priority levels of the plurality of detection regions comprises: determining the respective priority levels of the plurality of detection regions according to a positional relationship between the plurality of detection regions and the first region.

In an embodiment of the application, the determining of the respective priority levels of the plurality of detection regions comprises: determining a priority level of a detection region on a left side or a right side of the first region as a first priority level; determining a priority level of a detection region below the first region as a second priority level lower than the first priority level; and determining a priority level of a detection region above the first region as a third priority level lower than the second priority level.

In an embodiment of the application, the determining of the respective priority levels of the plurality of detection regions comprises: determining the respective priority levels of the plurality of detection regions according to a user's use preference.

In an embodiment of the application, the performing of the gesture recognition in the plurality of detection regions comprises: adjusting a color range of a skin color according to a color of the human face; and performing the gesture recognition in accordance with the color range of the skin color.

In an embodiment of the application, the adjusting of the color range of the skin color comprises: obtaining an average value of colors of multiple points of the human face, and adjusting the color range so that a center point of the color range is the average value.

In an embodiment of the application, the multiple points are symmetrically distributed on left and right portions of the human face.

In an embodiment of the application, the method for gesture recognition further comprises: storing information of the human face in response to detecting that the image includes the human face. As for user's images detected within a predetermined time after the information of the human face is stored, the gesture recognition is performed based on the stored information of the human face.

In an embodiment of the application, the method for gesture recognition further comprises: performing the gesture recognition in the image in response to detecting that the image does not include the human face.

In a second aspect of the application, there is provided a device for gesture recognition, comprising a processor, a memory and an image sensor. The processor executes programs stored in the memory to perform: acquiring an image of a user; detecting whether the image includes a human face; and performing gesture recognition based on information of the detected human face in response to detecting that the image includes the human face. The performing of the gesture recognition based on the information of the detected human face comprises: dividing a first region including the human face from the image; dividing another region except the first region into a plurality of detection regions; determining respective priority levels of the plurality of detection regions; and performing sequentially the gesture recognition in the plurality of detection regions in an order from a high priority level to a low priority level.

In an embodiment of the application, the plurality of detection regions are divided according to a preset shape and size.

In an embodiment of the application, the dividing of the plurality of detection regions includes: detecting a continuous skin color zone in the image; and dividing the plurality of detection regions so that at least one of the detection regions include the continuous skin color zone.

In an embodiment of the application, the determining of the respective priority levels of the plurality of detection regions comprises: determining the respective priority levels of the plurality of detection regions according to a positional relationship between the plurality of detection regions and the first region.

In an embodiment of the application, the determining of the respective priority levels of the plurality of detection regions comprises: determining the respective priority levels of the plurality of detection regions according to a user's use preference.

In an embodiment of the application, the performing of the gesture recognition in the plurality of detection regions comprises: adjusting a color range of the skin color according to a color of the human face; and performing the gesture recognition in accordance with the color range of the skin color.

In an embodiment of the application, the processor also executes the programs stored in the memory to perform a step of storing information of the human face in response to detecting that the image includes the human face. As for user's images detected within a predetermined time after the information of the human face is stored, the gesture recognition is performed based on the stored information of the human face.

BRIEF DESCRIPTION OF THE DRAWINGS

To illustrate technical solutions in embodiments of the present application more clearly, accompanied drawings of embodiments will be briefly described below. It shall be known that, the accompanied drawings described below are merely related to some embodiments of the application and are not construed as limiting of the present application, wherein.

DETAILED DESCRIPTION

For the sake of making technical solutions and merits in embodiments of the present application more clearly, hereinafter, technical solutions in embodiments of the present application will be clearly and fully described in combination with the accompanied drawings. Apparently, the embodiments to be described are merely a part of embodiments of the present application, rather than all the embodiments. All other embodiments, which are obtained by those skilled in the art on basis of the described embodiments of the present application without inventive efforts, fall into the protection scope of the present application.

Regarding the method and the device for gesture recognition according to embodiments of the application, the information of the human face is utilized, and the gesture recognition can be performed more efficiently without increasing the hardware cost.

Figure 1:
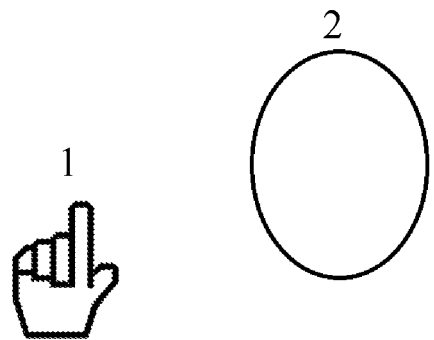
FIG. 1 is a schematic view showing an image acquired in a process of gesture recognition.

FIG. 1 is a schematic view showing an image acquired in the process of gesture recognition. In the common application scenarios, a user makes a gesture, and a smart equipment collects images regarding the gesture, and recognizes and analyzes the gesture to accomplish the human-computer interaction. Generally, the smart equipment such as smart televisions, smart mobile phones and so on, will each collect images within a relatively large range to cover various zones where the user's hands might appear. As shown in FIG. 1, a hand 1 and a face 2 of a user are often collected simultaneously.

Skin colors of the hand 1 and the face 2 are similar. If the skin color is used as a feature, the gesture recognition is directly performed on the figure as shown in FIG. 1, the portion of the face 2 may produce interference to the process of the gesture recognition, thereby increasing a difficulty of the gesture recognition.

Figure 2:
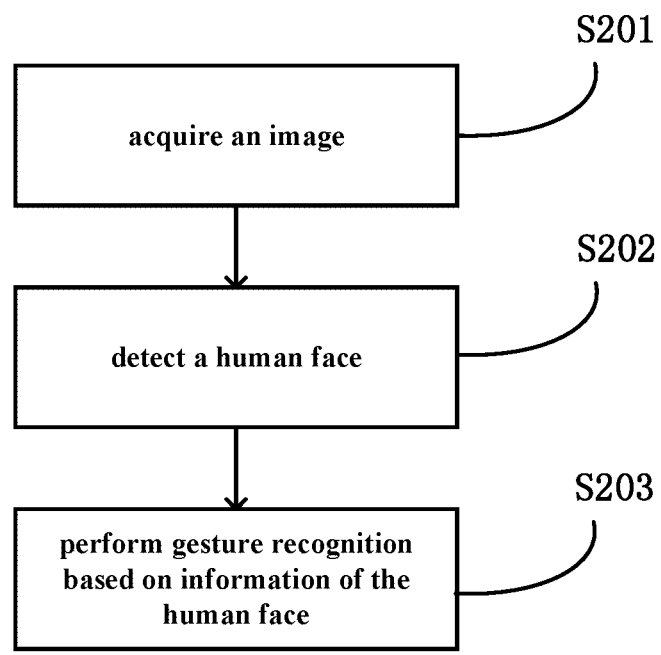
FIG. 2 is a schematic flowchart showing a method for gesture recognition provided by an embodiment of the present application.

FIG. 2 is a schematic flowchart showing a method for gesture recognition provided by an embodiment of the present application. As shown in FIG. 2, the method for gesture recognition includes: step S201: acquiring an image of a user; step S202: detecting whether the image includes a human face; step S203: performing gesture recognition based on information of the detected human face in response to detecting that the image includes the human face. The performing of the gesture recognition based on the information of the human face includes: dividing a first region including the human face from the image; dividing another region except the first region into a plurality of detection regions; determining respective priority levels of the plurality of detection regions; and performing sequentially the gesture recognition in the plurality of detection regions in an order from a high priority level to a low priority level until a result of the gesture recognition is obtained.

Performing the gesture recognition in the plurality of detection regions refers to the specific process of detecting the shape of a hand. After the human face is detected, detection of the shape of the hand is performed respectively in areas where the hand might appear, which can reduce an amount of calculation and improve efficiency and degree of accuracy.

Figure 3:
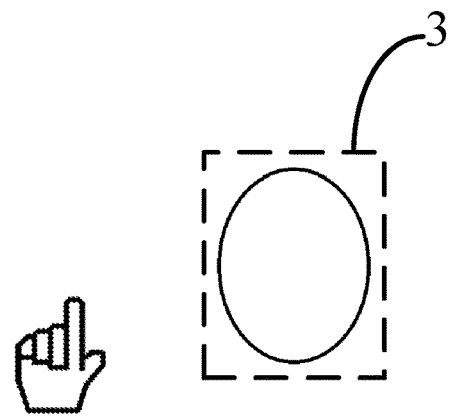
FIG. 3 is a schematic view showing that a human face is detected.

FIG. 3 is a schematic view showing that a human face is detected. As shown in FIG. 3, in step S202, a human face is detected. Then, in step S203, a first region 3 including the human face is divided. A shape and a size of the first region 3 can be set according to actual requirements, and for example, it may be a rectangle slightly larger than the detected human face so as to facilitate subsequent processing. In step S202, a human face detection can be performed using general algorithms provided by various program developing environments. For example, it is possible to use a human face detection module provided by the OpenCV, the Android system or the IOS system, and it is possible to use, for example, an Adboost classifier based on Haar features.

Figure 4:
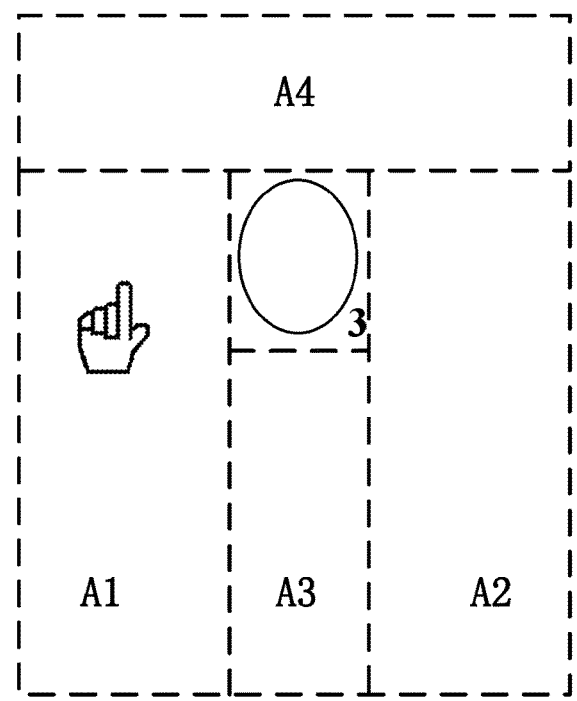
FIG. 4 is a schematic view showing division of a plurality of detection regions in the acquired image.

FIG. 4 is a schematic view showing division of a plurality of detection regions in the acquired image. As an example, in step S203, a plurality of detection regions may be divided according to a preset shape and size. As shown in FIG. 4, a plurality of detection regions are divided around the human face, wherein a first detection region A1 and a second detection region A2 are located at both sides of the human face, a third detection region A3 is located below the human face, and a fourth detection region A4 is located above the human face. It should be noted that the positional relationship as used herein such as "below", "above" and so on is referred to with respect to the ground on which the person stands.

After division of the plurality of detection regions, it is possible to set respective priority levels of the plurality of detection regions according to a positional relationship between the above plurality of detection regions and the first region. For example, the respective priority levels of the plurality of detection regions may be set corresponding to habits of people using their hands, so that the priority levels of detection regions at both sides of the human face are greater than the priority level of a detection region below the human face, and the priority level of the detection region below the human face is higher than the priority level of a detection region above the human face. That is, it is possible to cause the priority levels of the first detection region A1 and the second detection region A2 to be higher than the priority level of the third detection region A3 and cause the priority level of the third detection region A3 to be higher than the priority level of the fourth detection region A4. In this way, a detection region where the hand appears with a high possibility can be detected preferentially. Once a gesture is detected in a detection region with a high priority level, the process of gesture recognition can be stopped so as to avoid unnecessary computation and improve the efficiency.

Further, considering that utilization rate of a right hand is relatively higher, as for regions on both sides of the human face, a region corresponding to the right hand can be set to be detected preferentially. That is, the priority level of the first detection region A1 can be caused to be higher than the priority level of the second detection region A2.

Heights of the first detection region A1 and the second detection region A2 may be two to four times (e.g., three times) of height of the first region 3. Widths of the first detection region A1 and the second detection region A2 may be one to three times (e.g., two times) of width of the first region 3.

Figure 5:
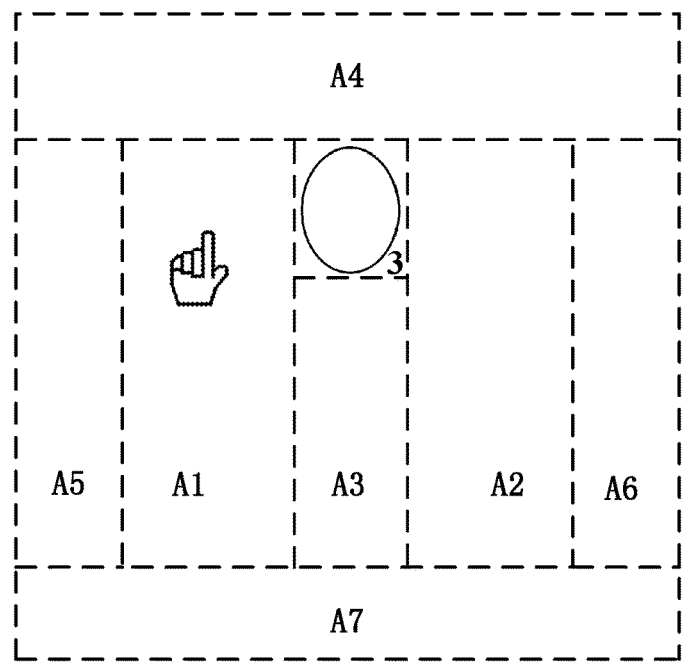
FIG. 5 is another schematic view showing division of a plurality of detection regions in the acquired image.

FIG. 5 is another schematic view showing division of a plurality of detection regions in the acquired image. As shown in FIG. 5, outside the regions as shown in FIG. 4, a fifth detection region A5, a sixth detection region A6, a seventh detection region A7 and so on may further be divided on the periphery. In correspondence with the possibility of appearing of the hand, the priority levels of the fifth detection region A5, the sixth detection region A6 and the seventh detection region A7 may be lower than that of the fourth detection region A4.

As shown in FIG. 4 and FIG. 5, the plurality of detection regions are divided, and the respective priority levels of the plurality of detection regions are set. In this way, when an algorithm for gesture recognition runs, only one detection region needs to be processed at a time, which can reduce an amount of computation significantly. Thereby, efficiency is improved and accuracy is enhanced.

In addition, it should be understood the division manners in FIG. 4 and FIG. 5 are merely exemplary, and in embodiments of the present application, any number, any size or any shape of the regions can be used.

The priority level of each detection region is set according to a positional relationship between each of the detection regions and the human face in the acquired image, and then, in accordance with the priority level of each of the detection regions, recognition is performed respectively in each of the detection regions. By doing this, it is possible to avoid interference of the human face and reduce the amount of computation. Consequently, efficiency and degree of accuracy of the gesture recognition are enhanced.

In an embodiment of the application, the priority level of each detection region may also be set according to other parameters.

Figure 6:
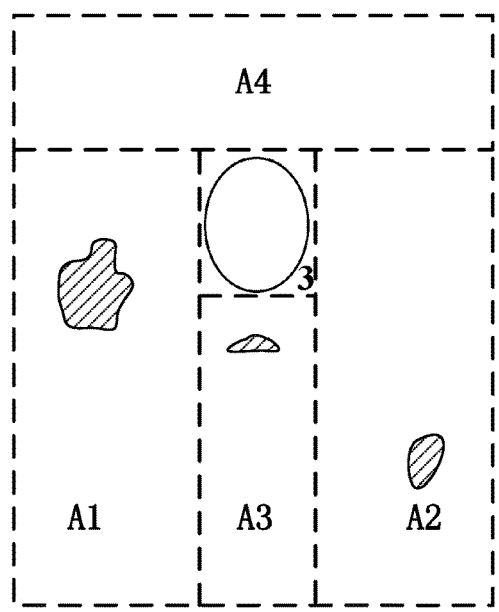
FIG. 6 is a schematic view exemplarily showing detection of a continuous skin color zone.

FIG. 6 is a schematic view exemplarily showing detection of a continuous skin color zone. As shown in FIG. 6, as an example, continuous skin color zones (as indicated by shadowed portions in FIG. 6) are detected in the first detection region A1, the second detection region A2 and the third detection region A3, and moreover, an area of the continuous skin color zone in the first detection region A1 is larger than that in the second detection region A2, and the area of the continuous skin color zone in the second detection region A2 is larger than that in the third detection region A3. In the general application scenarios, a hand portion (also possibly including a forearm portion connected thereto) is a body part with the continuous skin color that is most likely to be detected near the face portion, and thus the priority level of each detection region can be set according to the area of the continuous skin color zone in the detection region. In FIG. 6, it is possible to cause the priority level of the first detection region A1 to be higher than that of the second detection region A2, and the priority level of the second detection region A2 to be higher than that of the third detection region A3.

After the continuous skin color zones are detected, the respective priority levels of the plurality of detection regions are set, which can make the process of gesture recognition more targeted. The result obtained by the detection may be used for the process of gesture recognition as well, and thus no additional amount of computation will be added, either.

Various algorithms may be used for detection of the continuous skin color zone, and embodiments of the present application are not limited. For example, an image segmentation may be performed firstly using a preset skin color model. The preset skin color model includes a preset color range of a skin color, and the preset color range of the skin color may be expressed as (Cmin, Cmax). In a grayscale image, for example, Cmin and Cmax can represent the minimum and the maximum of grayscale values, respectively. A pixel within the color range may be labeled as 1, and a pixel within the color range may be labeled as 0, thereby achieving the image segmentation (or called as binarization).

Then, it is detected whether the pixels labeled as 1 are continuous. If there is another pixel labeled as 1 in surroundings of a pixel labeled as 1, these two pixels are continuous. Surroundings may refer to four directions of up, down, left and right, or may also refer to eight directions of up, upper left, upper right, left, right, lower left, lower right and down. In this process, the number of pixels is summed directly, and thus the area can be obtained. In addition, in order to further improve the efficiency, we can consider setting a threshold for the area of a continuous skin color zone. An area smaller than the threshold may not be considered, and the threshold may be set to be 50*50, for example.

The segmented image may also be directly used for the gesture recognition. The process of the gesture recognition may adopt various algorithms as well, and embodiments of the present application are not limited. For example, it is possible that based on the segmented image, a detection of the gesture is performed on basis of LBP features using the Adaboost classifier.

Figure 7:
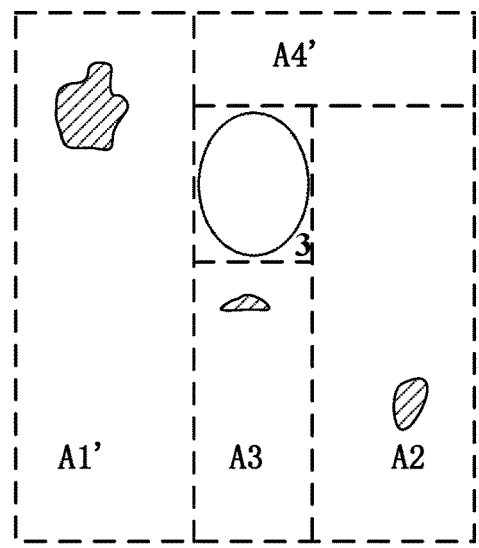
FIG. 7 is a schematic view exemplarily showing adjustment of division of the plurality of detection regions according to the detection result of the continuous skin color zone.

FIG. 7 is a schematic view exemplarily showing adjustment of division of the plurality of detection regions according to the detection result of the continuous skin color zone. In some cases, after the continuous skin color zone is detected, it may be found that the continuous skin color zone spans two or more regions. As shown in FIG. 7, the continuous skin color zone spans the original first detection region A1 and the fourth detection region A4. At this time, according to the distribution of the continuous skin color zone, the division of the plurality of detection regions is adjusted so that any continuous skin color zone is located in any one of the plurality of detection regions. As shown in FIG. 7, it is possible to adjust the division of the binarized regions according to the distribution of the continuous skin color zone so that the adjusted first detection region A1' comprises a complete continuous skin color zone.

Adjusting the division of the plurality of detection regions can make the process of gesture recognition more targeted. It shall be understood that there are no limits on the way of adjustment, as long as a complete continuous skin color zone is contained by any one of the regions.

As mentioned above, the division of the plurality of detection regions may be performed statically, wherein the plurality of detection regions are divided around the human face according to a predetermined number and shape thereof, and the adjustment may be performed later. However, this is not a limitation of the application, and it shall be understood that, the division of the plurality of detection regions may also be performed dynamically.

In an embodiment of the application, the division of the plurality of detection regions may include: detecting a continuous skin color zone in the image; and dividing the plurality of detection regions so that at least one of the detection regions include the continuous skin color zone.

Figure 8:
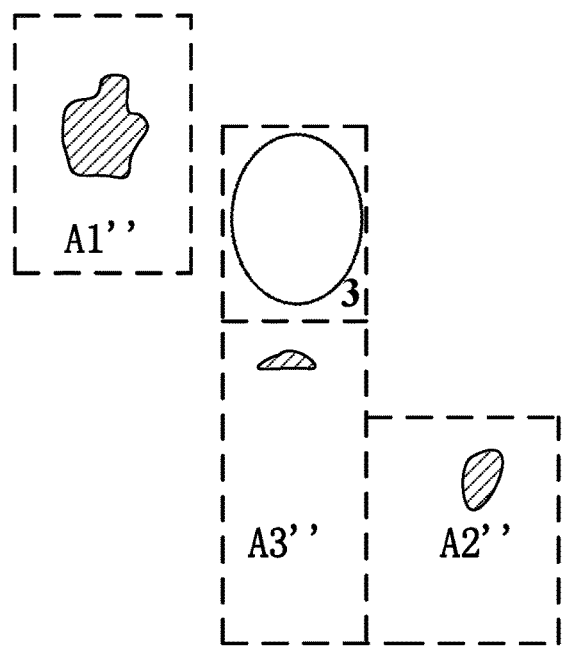
FIG. 8 is a schematic view exemplarily showing division of the plurality of detection regions according to the detection result of the continuous skin color zone.

FIG. 8 is a schematic view exemplarily showing division of the plurality of detection regions according to the detection result of the continuous skin color zone. Detecting the continuous skin color zone is an image processing method used commonly. Therefore, the process may be conveniently performed after the human face is detected or while the human face is detected, and the continuous skin color zone outside the human face can be obtained. As shown in FIG. 8, in an embodiment of the application, a first detection region A1" may be divided directly according to the result of detection to contain the largest continuous skin color zone outside the human face and have the set highest priority level. Similarly, a second detection region A2" and a third detection region A3" may be divided, and the priority level of the second detection region A2" is caused to be higher than that of the third detection region A3".

In an embodiment of the application, the division and the priority setting of the detection regions may be performed at the same time directly according to the detection result of the continuous skin color zone. In the case that the position where the hand appears changes constantly, such a scheme can be applied better.

As mentioned above, in the process of gesture recognition, the position information of the human face can be sufficiently utilized to improve the efficiency and the accuracy. Furthermore, the color information of the human face can be also utilized to facilitate the process of gesture recognition.

Figure 9:
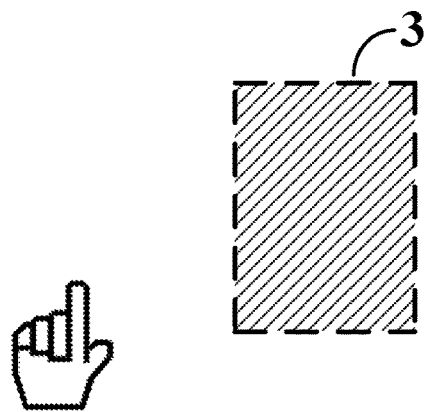
FIG. 9 is a schematic view showing alteration of a color of the human face in the acquired image.

FIG. 9 is a schematic view showing alteration of a color of the human face in the acquired image. As shown in FIG. 9, the method for gesture recognition may further include: altering a color of the first region to distinguish the color of the first region from a skin color. This step may be executed immediately after the first region is detected. For example, the human face portion may be set to be full white, full black or any other color outside a skin color range, and preferably, the human face portion may be set to a color that has a relatively big difference with the skin color and background, such as full yellow, full green or the like. In this way, it is possible to further prevent interference to the process of dividing the plurality of detection regions and the like, and to prevent interference to the gesture recognition due to the closeness of the skin color of the human face to the skin color of the hand.

Figure 10:
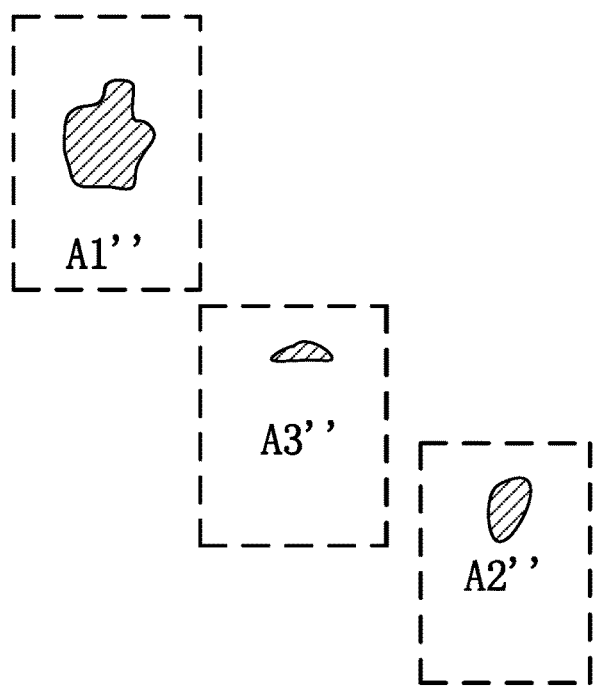
FIG. 10 is a schematic view showing detection of the continuous skin color zone on basis of FIG. 9.

FIG. 10 is a schematic view showing detection of the continuous skin color zone on basis of FIG. 9. As shown in FIG. 10, after image segmentation (binarization), as compared with FIG. 8, a region of the human face portion can be removed. The interference of the human face can be further prevented by performing gesture recognition on basis of FIG. 10.

Figure 11:
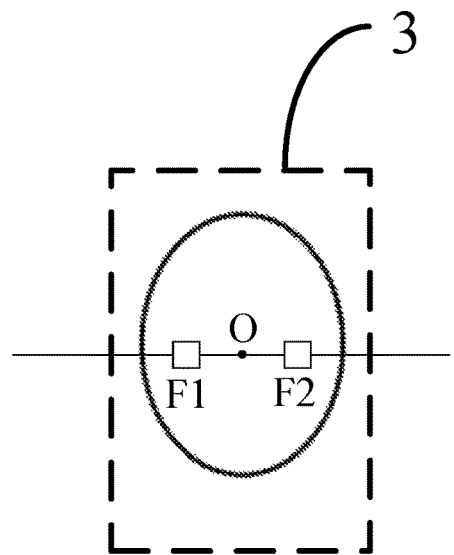
FIG. 11 is a schematic view exemplarily showing acquisition of an average value of the skin color information of the human face.

FIG. 11 is a schematic view exemplarily showing acquisition of an average value of the skin color information of the human face. As mentioned above, a preset skin color model is used for the image segmentation. In an embodiment of the application, it is also possible to adjust the preset skin color model, particularly to adjust a color range, according to a color of the human face. Specifically, the adjustment of the preset skin color model may include: obtaining an average value of colors of multiple points of the human face; and adjusting a color range so that a center point of the color range is the average value.

As an example, when the average value of the colors of the multiple points of the human face is obtained, the multiple points may be symmetrically distributed on left and right portions of the human face. As shown in FIG. 11, a center point O of a width of the human face in a left-right direction is set, and a first range F1 and a second range F2 are symmetric with respect to the center point O and lie in the same horizontal line. The average value of the colors of all points in the first range F1 and the second range F2 is calculated and expressed as Cv.

It shall be understood that, the positions and the shapes of the first range F1 and the second range F2 can each be set arbitrarily. As an example, distances from centers of the first range F1 and the second range F2 to the center point O are made to be ¼ of a width of the human face detection region 3, and the widths of the first range F1 and the second range F2 are ⅛ of the width of the human face detection region 3.

In addition, the heights of the first range F1 and the second range F2 may be ⅙ of the width of the human face detection region 3.

In a grayscale image, for example, a single value is used to represent the grayscale or the color, and in this case, the average value Cv may be a single value. In a color image, for example, multiple values are used to represent the color. The average value Cv may contains multiple values, such as Rv, Gv and Bv values respectively representing red, green and blue in the RGB manner, U and V values in the YUV manner, Cb and Cr values in the YCbCr, or the like.

In the following, an example will be given to describe how to adjust a color range of the skin color according to the obtained average value Cv of the colors of the human face, wherein a single value is used to represent the grayscale or the color. The preset color range of the skin color may be (Cmin, Cmax), and a value of an original center point is Cmid=(Cmin+Cmax)/2. If Cv<Cmid, the color range can be adjusted to be (Cmin, Cv+(Cv−Cmin)), and the value of the center point is Cv. If Cv>Cmid, the color range can be adjusted to be (Cv−(Cmax−Cv), Cmax), and the value of the center point is Cv. If Cv=Cmix, it is not necessary to adjust.

It shall be understood that, when the multiple values are used to represent the color, the above adjustments can be performed for each value, and the specific process will not be described in detail.

In an embodiment of the application, after the acquisition of the image of the human face, not only the position information of the human face can be used to find the area where the hand may appear, but also the color information of the human face can be used to adjust a skin color model required by the gesture recognition. The degree of accuracy of the gesture recognition can be further improved.

In an embodiment of the application, the position information and the color information of the human face are sufficiently utilized so that the efficiency and the degree of accuracy of the gesture recognition can be improved, which can also be applied to the gesture recognition of multiple users.

Figure 12:
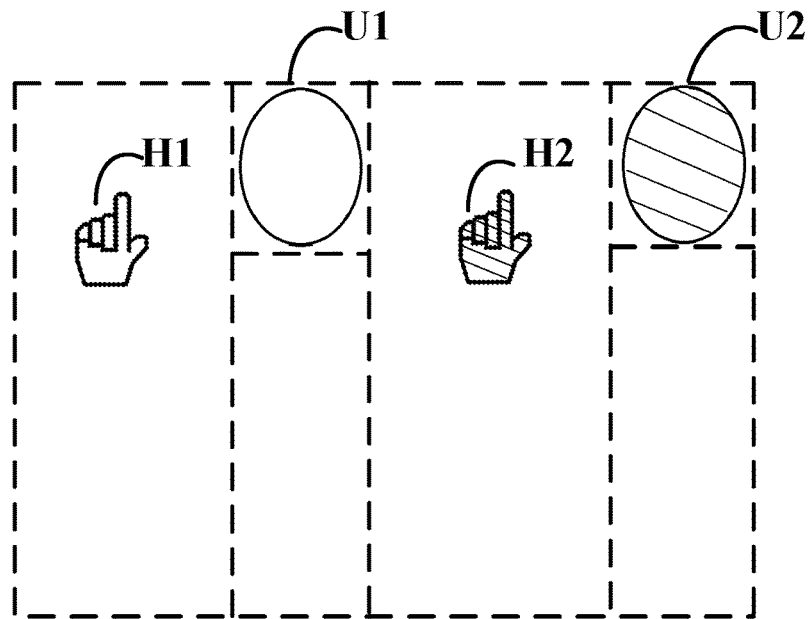
FIG. 12 is a schematic view exemplarily showing gesture recognition of multiple users.

FIG. 12 is a schematic view exemplarily showing the gesture recognition of multiple users. As shown in FIG. 12, taking two users as an example, a first user U1 operates with a right hand H1, and a second user U2 operated with a right hand H2.

In accordance with the position information of the human faces, for the first user U1, the area where the right hand H1 is located may be detected preferentially, and for the second user U2, the area where the right hand H2 is located may be detected preferentially. In this way, the correspondence relationship between the hand and the user can be obtained easily.

In addition, generally, colors of the face and the hand of the same user are closer. The face and the hand of the first user U1 belong to a first color range, and the face and the hand of the second user U2 belong to a second color range. Therefore, it is also easy to match the hand H1 with the first user U1 and match the hand H2 with the second user U2 by comparing the colors of the hand and the face.

In embodiments of the application, the priority level of each detection region may also be set by many other ways. For example, the priority level of each detection region may be set according to a user's preference. A user may be accustomed to operating with his left hand or operate by holding a hand over his head. The user can set these detection regions to be the detection regions with the highest priority level by himself. In addition, the smart equipment can also automatically set, according to a history record, a detection region in which the gesture appears most often within a given time to be a detection region with the highest priority level.

In an embodiment of the application, considering that a motion frequency of the human face is generally far less than that of the hand, after the human face is detected, the position information and the color information of the image of the human face may be stored and directly used for operation of multiple gesture recognitions. For example, taking a few seconds as one period, a face recognition is performed once during each period, and the position information, the color information and so on of the human face are stored. Then, during this period, for a predetermined number of images obtained later, the gesture recognition is performed using the stored information of the human face. In this way, the efficiency of the gesture recognition can be further enhanced while the degree of accuracy is improved.

In an embodiment of the application, when the human face is not detected, the detection of the gesture is performed directly in the acquired image.

Figure 13:
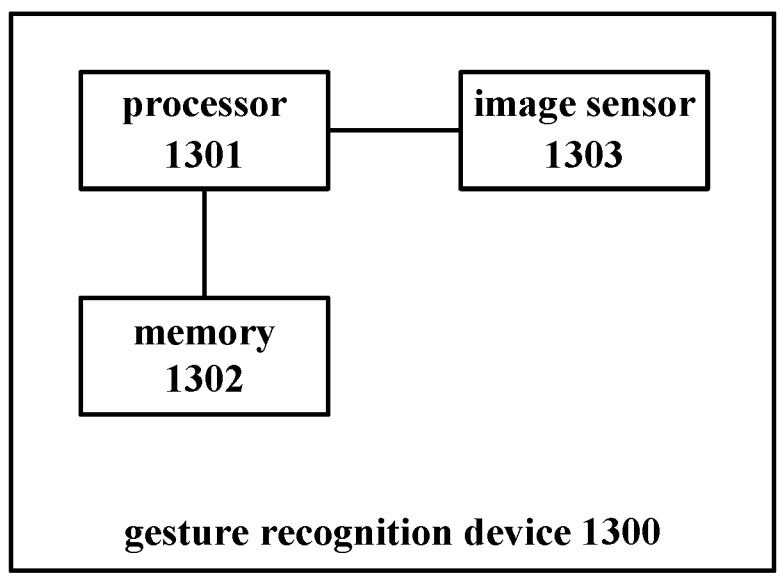
FIG. 13 is a block diagram exemplarily showing a device for gesture recognition.

FIG. 13 is a block diagram exemplarily showing a device for gesture recognition. As shown in FIG. 13, a device 1300 for gesture recognition includes a processor 1301, a memory 1302 and an image sensor 1303. The processor 1300 executes programs stored in the memory to perform steps of: acquiring an image of a user; detecting whether the image includes a human face; and in response to detecting that the image includes the human face, performing gesture recognition based on information of the detected human face. Performing the gesture recognition based on the information of the human face includes: dividing a first region including the human face in the image; dividing a plurality of detection regions outside the first region; determining respective priority levels of the plurality of detection regions; and in an order from a high priority level to a low priority level, performing the gesture recognition in the plurality of detection regions in sequence until a result of the gesture recognition is obtained.

The device for gesture recognition may be any special or general apparatus, and for example, the device for gesture recognition may be a smart mobile phone. The processor 1301 and the memory 1302 are an existing processor and memory in the smart mobile phone, and the image sensor 1303 is an existing imaging assembly in the smart mobile phone.

The methods for gesture recognition that have been described can each be executed by the device for gesture recognition as shown in FIG. 13. Therefore, at least the following technical solutions can be provided.

In the device for gesture recognition according to an embodiment of the application, a plurality of detection regions are divided according to a preset shape and size.

In the device for gesture recognition according to an embodiment of the application, the division of the plurality of detection regions includes: detecting a continuous skin color zone in the image; and dividing the plurality of detection regions so that at least one of the detection regions include the continuous skin color zone.

In the device for gesture recognition according to an embodiment of the application, the determining of the respective priority levels of the plurality of detection regions comprises: determining the respective priority levels of the plurality of detection regions according to a positional relationship between the plurality of detection regions and the first region.

In the device for gesture recognition according to an embodiment of the application, the determining of the respective priority levels of the plurality of detection regions comprises: determining the respective priority levels of the plurality of detection regions according to a user's use preference.

In the device for gesture recognition according to an embodiment of the application, the performing of the gesture recognition in the plurality of detection regions includes: a color range of a skin color is adjusted according to a color of the human face; and performing the gesture recognition in accordance with the color range of the skin color.

In the device for gesture recognition according to an embodiment of the application, the processor 1300 also executes the programs stored in the memory to perform a step of storing information of the human face in response to detecting that the image includes the human face. As for images of the user detected within a predetermined time after the information of the human face is stored, the gesture recognition is performed based on the stored information of the human face.

In the device for gesture recognition according to an embodiment of the application, the processor 1300 also executes the programs stored in the memory to perform a step of performing the gesture recognition in the image in response to detecting that the image does not include the human face.

As mentioned above, in the method for gesture recognition and the device for gesture recognition according to embodiments of the application, a process of detecting a human face is included, and after a position of the human face is obtained, the gesture recognition is preferentially performed on a region in which the hand appears with a high possibility. After a color of the human face is acquired, a skin color model used for the gesture recognition can also be updated dynamically. According to embodiments of the application, the efficiency and the degree of accuracy of the gesture recognition can be enhanced.

It can be understood that, the above embodiments are merely exemplary embodiments adopted for explaining principle of the application, but the application is not limited thereto. Various modifications and improvements can be made by those skilled in the art without departing from the spirit and essence of the application, and these modifications and improvements are also deemed as the protection scope of the application.

What is claimed is:

1. A method for gesture recognition, comprising:
   acquiring an image of a user;
   detecting whether the image includes a human face; and
   performing gesture recognition based on information of the human face in response to detecting that the image includes the human face;
   wherein the performing of the gesture recognition based on the information of the human face comprises:
   dividing a first region including the human face from the image;
   dividing another region except the first region into a plurality of detection regions;
   determining respective priority levels of the plurality of detection regions; and
   performing sequentially the gesture recognition in the plurality of detection regions in an order from a high priority level to a lower priority level.

2. The method for gesture recognition of claim 1, wherein the plurality of detection regions are divided according to a preset shape and size.

3. The method for gesture recognition of claim 1, wherein the dividing of the plurality of detection regions includes: detecting a continuous skin color zone in the image; and dividing the plurality of detection regions so that at least one of the detection regions include the continuous skin color zone.

4. The method for gesture recognition of claim 3, wherein the determining of the respective priority levels of the plurality of detection regions comprises:
   determining the respective priority levels of the plurality of detection regions according to an area of the continuous skin color zone contained in each of the detection regions.

5. The method for gesture recognition of claim 1, further comprising: altering a color of the first region to distinguish the color of the first region from a skin color.

6. The method for gesture recognition of claim 1, wherein the determining of the respective priority levels of the plurality of detection regions comprises:
   determining the respective priority levels of the plurality of detection regions according to a positional relationship between the plurality of detection regions and the first region.

7. The method for gesture recognition of claim 6, wherein the determining of the respective priority levels of the plurality of detection regions comprises:
   determining a priority level of a detection region on a left side or a right side of the first region as a first priority level;
   determining a priority level of a detection region below the first region as a second priority level lower than the first priority level; and
   determining a priority level of a detection region above the first region as a third priority level lower than the second priority level.

8. The method for gesture recognition of claim 1, wherein the determining of the respective priority levels of the plurality of detection regions comprises:
   determining the respective priority levels of the plurality of detection regions according to a use preference of the user.

9. The method for gesture recognition of claim 1, wherein the performing of the gesture recognition in the plurality of detection regions comprises:
   adjusting a color range of a skin color according to a color of the human face; and
   performing the gesture recognition in accordance with the color range of the skin color.

10. The method for gesture recognition of claim 9, wherein the adjusting of the color range of the skin color comprises:
    obtaining an average value of colors of multiple points of the human face, and
    adjusting the color range so that a center point of the color range is the average value.

11. The method for gesture recognition of claim 1, further comprising: storing information of the human face in response to detecting that the image includes the human face;
    wherein as for images of the user detected within a predetermined time after the information of the human face is stored, the gesture recognition is performed based on the stored information of the human face.

12. A device for gesture recognition, comprising a processor, a memory and an image sensor; wherein the processor executes programs stored in the memory to perform:
    acquiring an image of a user;

detecting whether the image includes a human face; and performing gesture recognition based on information of the human face in response to detecting that the image includes the human face;

wherein the performing of the gesture recognition based on the information of the human face comprises:

dividing a first region including the human face from the image;

dividing another region except the first region into a plurality of detection regions;

determining respective priority levels of the plurality of detection regions; and performing sequentially the gesture recognition in the plurality of detection regions in an order from a high priority level to a low priority level.

13. The device for gesture recognition of claim 12, wherein the processor also executes the programs stored in the memory to perform a step of altering a color of the first region to distinguish the color of the first region from a skin color.

14. The device for gesture recognition of claim 12, wherein the determining of the respective priority levels of the plurality of detection regions comprises:

determining the respective priority levels of the plurality of detection regions according to a positional relationship between the plurality of detection regions and the first region.

15. The device for gesture recognition of claim 12, wherein the determining of the respective priority levels of the plurality of detection regions comprises:

determining the respective priority levels of the plurality of detection regions according to a use preference of the user.

16. The device for gesture recognition of claim 12, wherein the performing of the gesture recognition in the plurality of detection regions comprises:

adjusting a color range of a skin color according to a color of the human face; and performing the gesture recognition in accordance with the color range of the skin color.

\* \* \* \* \*